No. 776,806. PATENTED DEC. 6, 1904.
A. C. SARGENT.
FRICTION CLUTCH.
APPLICATION FILED NOV. 21, 1902.
NO MODEL. 2 SHEETS—SHEET 1.
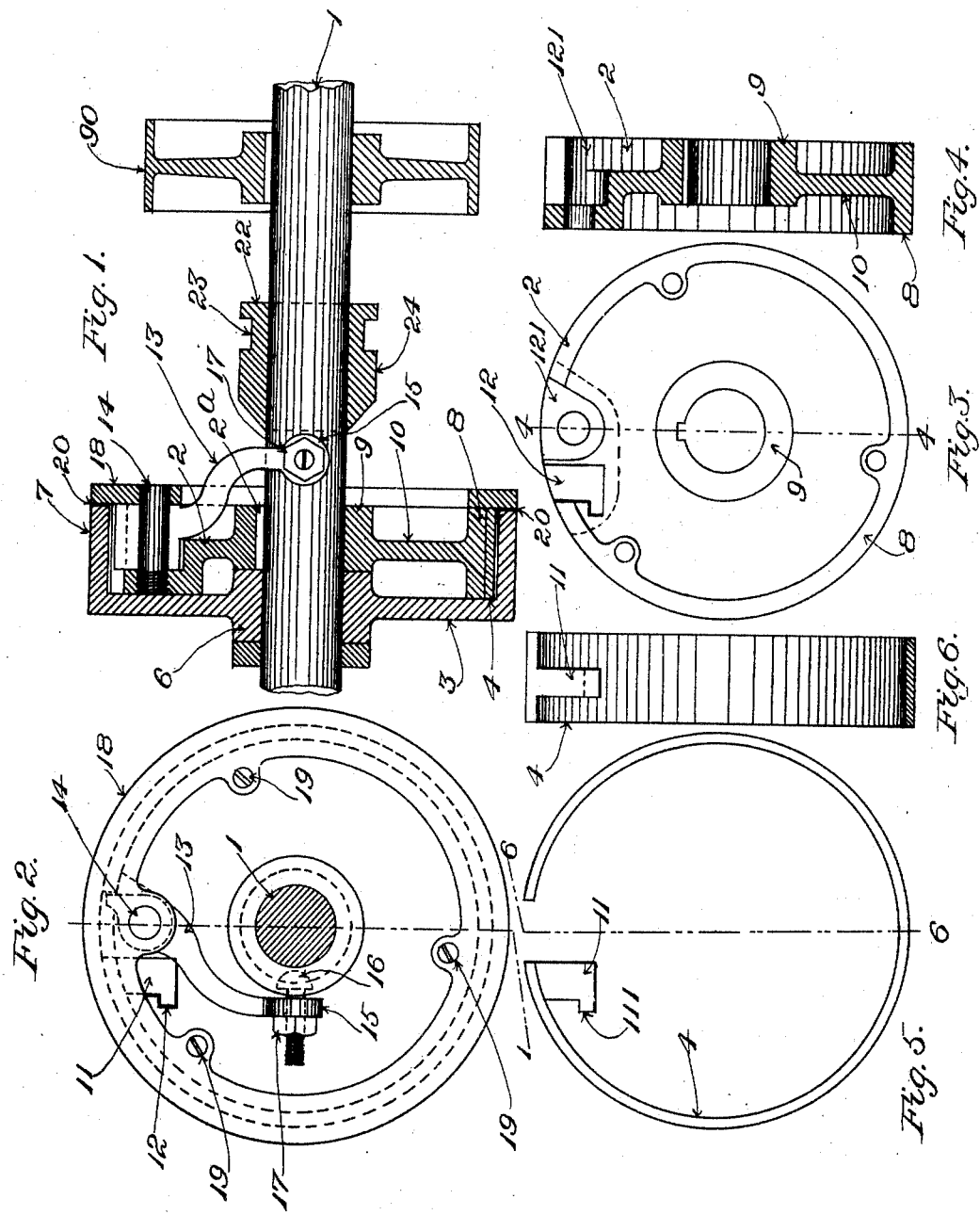
WITNESSES:
Oscar F. Hill
Aline Tarr
INVENTOR.
Allan C. Sargent
BY Macleod Calver &
Randall
ATTORNEYS.

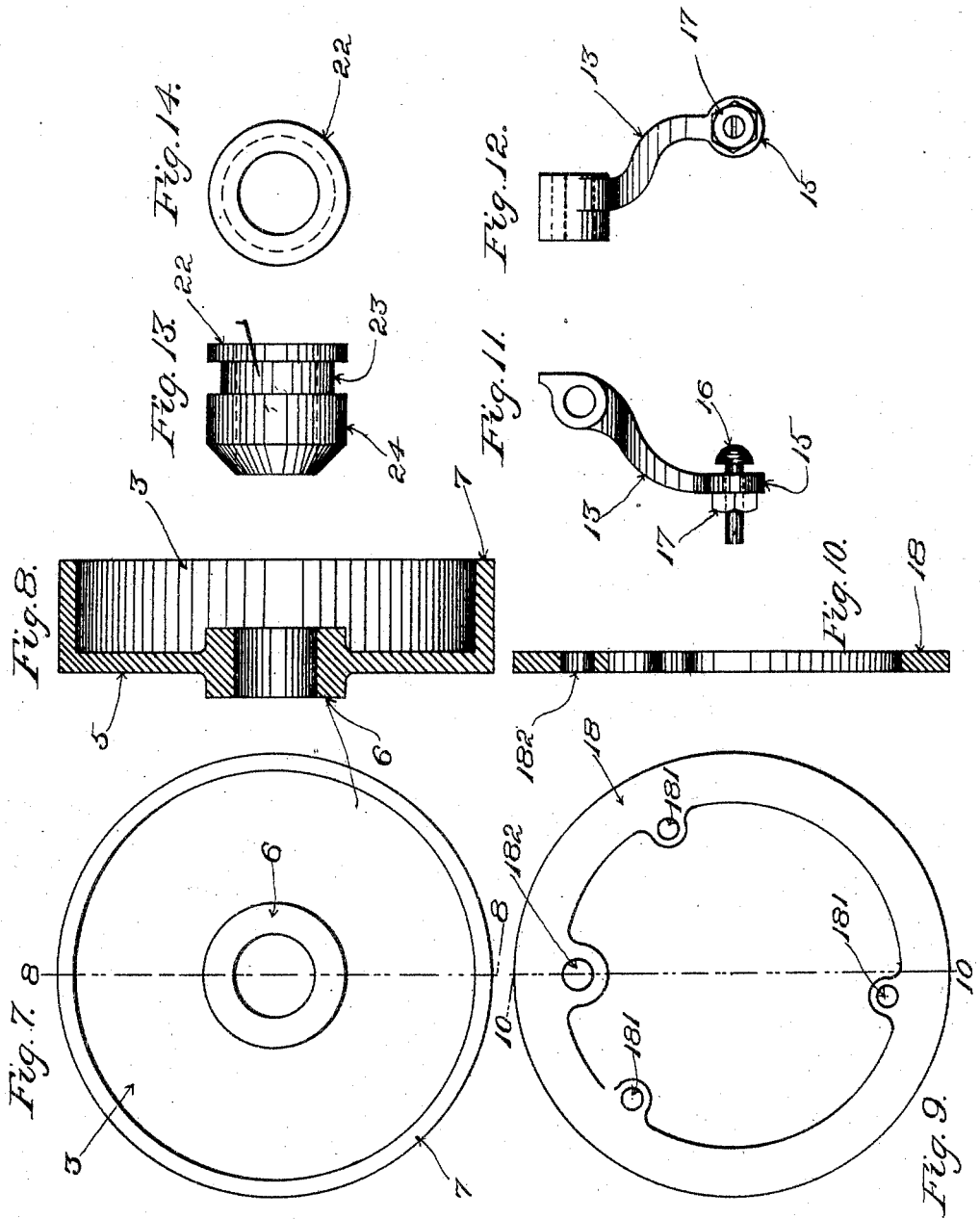

No. 776,806.                                                                                    Patented December 6, 1904.

UNITED STATES PATENT OFFICE.

ALLAN CAMERON SARGENT, OF GRANITEVILLE, MASSACHUSETTS.

FRICTION-CLUTCH.

SPECIFICATION forming part of Letters Patent No. 776,806, dated December 6, 1904.

Application filed November 21, 1902. Serial No. 132,213. (No model.)

*To all whom it may concern:*

Be it known that I, ALLAN CAMERON SARGENT, a citizen of the United States, residing at Graniteville, in the county of Middlesex, State of Massachusetts, have invented a certain new and useful Improvement in Friction-Clutches, of which the following is a specification, reference being had therein to the accompanying drawings.
My invention has relation to the mechanisms which commonly are known as "friction-clutches," and more especially to friction-clutches of that type wherein the driving engagement of the driving and driven members with each other is effected by means of a split friction-ring carried by one of the members, which said ring is capable of being varied in diameter when desired, so as to bear against the contiguous surface of the other member and produce sufficient friction to compel the said members to rotate together.

In the drawings, Figure 1 shows a portion of a shaft having applied thereto a clutch embodying the present invention, the parts being mainly in section on a plane extending lengthwise and centrally of the said shaft. Fig. 2 is an elevation from the left-hand end in Fig. 1. Fig. 3 is a front elevation of the clutch member which acts as the carrier for the split friction-ring. Fig. 4 is a view of the same in section on line 4 4, Fig. 3. Figs. 5 and 6 are respectively front and sectional views of the split friction-ring, the section in Fig. 6 being on line 6 6, Fig. 5. Fig. 7 is an exterior view of the casing within which the clutch member forming the carrier for the split ring rotates. Fig. 8 is a view of the same in section on line 8 8, Fig. 7. Fig. 9 is a front view of the annulus or flange by which the clutch members are retained in proper relative positions and held in alinement with each other; and Fig. 10 is a view of said annulus or flange in section on line 10 10, Fig. 9. Figs. 11 and 12 are respectively front and side views of the lever or dog by the movement of which the friction-ring is operated. Figs. 13 and 14 are views of the sliding cam or cone by which the movement of the dog or lever shown in Figs. 11 and 12 is effected.

Referring to the drawings, 1 is the shaft upon which the clutch is carried. The said clutch is composed of two principal members 2 and 3, the member 2 being located within and inclosed by the other member, 3. The inner member 2 is fixed to shaft 1, as by means of a spline or key $2^a$, Fig. 1. At its periphery it is formed with a face or flange 8 for coöperation with the split friction-ring 4, by means of which the inner and outer clutch members are brought into engagement in a manner hereinafter described. The outer member 3 of the clutch is mounted to turn freely upon the shaft 1. It is shown separately in Figs. 7 and 8. It comprises a preferably web-like portion 5, provided with a hub 6, fitting the said shaft. Member 3 is formed with the lateral flange 7, as shown in Figs. 1 and 8, which in the assembled clutch projects across the face or flange 8 of the inner clutch member 2. The inner face of the said flange is intended to coöperate with the split ring 4. The inner diameter of the flange 7 of the outer clutch member exceeds that of the outer diameter of the inner clutch member by an amount sufficient to allow the split ring 4, which in its normal condition fits closely against the acting face of one of the clutch members, to be entirely out of contact with the opposing surface of the other clutch member, so that at times the clutch members may revolve freely and independently of one another.

The power to be transmitted by means of the clutch may be applied to the shaft 1 and delivered from the outer clutch member, or vice versa. For the purpose of transmitting power to or from shaft 1 I fasten thereon a pulley 90; but any other well-known method of power transmission may be employed. If desired, the exterior of the outer clutch member 3 may be formed as a pulley-face, as shown, or as a gear, or any other power-transmitting device may be fixed or formed thereupon or be connected therewith.

The inner clutch member or carrier 2 is shown separately in Figs. 3 and 4. It is provided with a hub 9, by means of which it finds a bearing on the shaft 1. Integral with this hub 9 and serving to connect it with the peripheral flange or face 8 is a web 10, or, if desired, spokes may be employed for this purpose. The flange or face 8 extends along substantially the entire periphery of the clutch member and is of a width allowing it to fit entirely within the space that is inclosed by the lateral flange 7 of the exterior clutch member 3.

4 is the split friction-ring by which the engagement of the two clutch members is effected. This ring 4 is shown separately in Figs. 5 and 6. It forms practically a complete ring, its ends, however, being separated by a short intervening space. In its normal condition it fits over the acting face of one of the clutch members, herein the periphery of the inner clutch member 2. The thickness of the said ring and the distance separating the outer face of the peripheral flange 8 of the inner clutch member 2 from the inner face of the lateral flange 7 of the outer clutch member are such that in the unexpanded state of the said ring 4 the outer surface of the ring 4 does not come in contact with the inner surface of said flange 7.

In an expansion-ring clutch on the order of that which has been described one member carries the split ring, the said ring being fixed thereon so as to prevent rotation of the ring relatively to the clutch member by which it is carried. When it is desired to cause the clutch members to become engaged with each other, the diameter of the ring is varied by moving the ends thereof relative to each other until there is such a change in the diameter of the said ring as to cause the same to be forced against the contiguous surface prepared for that purpose on the outer clutch member, thus compelling the clutch members to rotate together.

The features which I have thus far described above are similar in general to those which have heretofore been employed in friction-clutch construction, and I do not claim that any novelty resides therein.

The split ring in all clutches which I have actually met with in practice heretofore has been prevented from moving relatively to its carrier by means of the device by which its ends are caused to move relative to each other, the said device being in practice mounted upon the said carrier. This method, however, is apt to throw an undue strain upon the device in question, and it is therefore preferable to provide a stop or abutment on the carrier by which all strain is removed from the said device. The construction and manner of mounting the split ring upon its carriers should also preferably be such that the said ring may be readily removed and a new one inserted when rendered necessary by wear. It has furthermore been observed in practice that clutches making use of a split ring for engaging the clutch members are the most efficient and sensitive when the stop or abutment for the split ring is located at one end of the split ring instead of at some point nearer the middle thereof.

In order to secure the desirable results just enumerated, I have in the illustrated form of my invention caused the split ring 4 to be provided with a lug 11, Figs. 2 and 5, formed or fixed upon one end thereof, by which lug the ring is secured in place on the clutch member by which it is carried. In the illustrated embodiment of the invention the inner clutch member 2 constitutes the carrier for the split ring, and the said ring is operated by separating its ends from each other so as to expand the ring into contact with the interior surface of flange 7 of the outer clutch member. The said lug 11 is preferably of the general form shown in Fig. 5—that is to say, it is formed as a parallel-sided block having a laterally-projecting lip 111 on one side thereof at the inner end of the block. The inner clutch member or carrier 2 is constructed with a recess in the periphery of the same at 12, Fig. 2, which corresponds in shape and size to the exterior of the lug 11. When it is desired to place the ring 4 in position on the inner clutch member or carrier 2, the ring is slipped edgewise onto the periphery of said clutch member or carrier, and the lug 11 by entering the recess 12 will lock the ring from either radial or circumferential movement, and thereby prevent its movement relatively to the clutch member 2. The expansion of the ring 4 by the spreading apart of its ends is effected by means of a lever or dog 13. The said lever is pivoted on a stud 14, which is screwed into or otherwise applied to or fixed upon the inner clutch member 2 adjacent the periphery thereof. The hub portion of the said lever occupies an offset recess 121, formed by correspondingly offsetting the web of the clutch member 2, the said recess 121 being located adjacent the recess 12, and both of said recesses 12 and 121 are located at a space where the face or flange 8 is discontinuous and the ends of said flange are somewhat separated from each other. The shorter arm of lever 13 bears against the free end of the expansible ring, while the longer arm of the said lever extends inwardly toward and to one side of the center, as shown in Fig. 2, and also is bent outwardly from the clutch in the direction of the length of shaft 1 until its end 15 is located at a point entirely outside the clutch. In the said end of the said lever-arm is fixed a contact-point 16, which is adjustable in the end of the lever-arm, so that the distance between its end and the center of the shaft may be varied at will. The said contact-point is constituted by a screw having its head turned inwardly and its threaded stem fitted to a hole tapped in the inner arm of the lever. It is preferably provided with a nut 17, by which it may be locked in any desired position of adjustment.

At 18 is an annulus or flange, which is fastened to one side of the inner clutch member or carrier 2 by the screws 19 19 19, passing through holes 181 181 181 in said annulus or flange. A hole 182 is also provided in the said annulus or flange, fitting over the outer end of stud 14 and affording an additional support for the said stud. The said flange 18 holds ring 4 and the operating-lever 13 in place. It also fits closely to the edge of the flange 7 of the outer clutch member 3, as at 20, so that the spaces between the clutch members and ring 4 and also the contacting surfaces of the outer clutch member and said ring may be rendered inaccessible to dust or grit from the outside.

To operate the lever 13 so as to cause the expansion of the friction-ring and the consequent engagement of the clutch members, I employ a sliding cam or cone 22. The said cam or cone is freely movable laterally upon shaft 1 by means of a shipper (not shown) engaging in the groove 23 of the same. The end of the cam or cone nearest the clutch tapers from a size closely approximating the diameter of the shaft 1 to a diameter which is great enough to give to the contact-point 16 a movement away from the center of shaft 1 sufficient to cause the amount of expansion of ring 4 required to effect the engagement of the clutch members, and preferably the proportions of the parts should be such that the contact-point 16 should when the clutch members are locked together rest upon the portion 24 of the cam or cone 22, said portion 24 being substantially parallel to the main shaft, thereby causing the clutch members to remain in engagement when it is so desired until it is desired to release them.

What I claim is—

1. In a friction-clutch, in combination, a split ring having one end thereof provided with a lug projecting therefrom, a clutch member provided with supporting means for the said ring at the interior of the latter, and formed with a recess or socket within which the said lug fits, the said recess or socket having a lateral opening through which the lug enters and leaves the same, and also having walls engaging with the lug to prevent radial and circumferential movement thereof, a second clutch member having a surface with which the ring coacts, and a ring-expander carried by the first clutch member and acting against the free end of the said ring.

2. In a friction-clutch, in combination, a split ring having one end thereof provided with a lug projecting therefrom, a clutch member provided with a cylindrical support for the said ring at the interior of the latter, and formed with a recess or socket within which the said lug fits, the said recess or socket having a lateral opening through which the lug enters and leaves the same, and also having walls engaging with the lug to prevent radial and circumferential movement thereof, a ring-expander carried by the said clutch member and acting against the free end of the said ring, and a second clutch member having a surface with which the ring coacts.

3. In a friction-clutch, in combination, a split ring having one end thereof provided with a lug projecting radially inward therefrom, a clutch member provided with a support for the said ring at the interior of the latter, and formed with a recess or socket within which the said lug fits, the said recess or socket having a lateral opening through which the lug enters and leaves the same, and also having walls engaging with the lug to prevent radial and circumferential movement thereof, a ring-expander carried by the said clutch member and acting against the free end of the ring, a second clutch member having a surface with which the said ring coacts, and a covering-flange at the outer side of the clutch members bridging the radial space between them.

4. In a friction-clutch, in combination, a split ring having one end thereof provided with a lug projecting therefrom, a clutch member formed with a recess or socket within which the said lug fits, the said recess or socket having a lateral opening through which the lug enters and leaves the same, and also having walls engaging with the lug to prevent radial and circumferential movement thereof, a ring-expander carried by the said clutch member and acting against the free end of the said ring, and a second clutch member having a surface with which the ring coacts.

5. In a friction-clutch, in combination, a split ring having one end thereof provided with a locking-lug projecting therefrom, a clutch member having a support for the said ring at the interior of the latter, and also having a recess or socket which receives the said lug by a transverse movement but holds the same from radial and circumferential movement, a ring-expander, a pivot for said ring-expander engaging with said clutch member, a second clutch member having a surface with which the said ring engages, a covering-flange at the side of said clutch members provided with a support for the outer end of said pivot, and means to operate the said ring-expander.

6. In a friction-clutch, in combination, an outer member, an inner member having a transverse socket or recess, as 12, an expansible ring interposed between said members, provided at one end thereof with a lug adapted to fit in said recess, and engaging with said clutch member to prevent radial and circumferential movement of said end of the ring and having the other end thereof free, and means acting against the said free end to expand the ring into engagement with the outer member, substantially as described.

7. A friction-clutch comprising, essentially, the inner member having a socket or recess, the outer member, the split ring between the flanges of said members and by which the engagement of the inner and the outer clutch members with each other may be effected, the said ring having at one end thereof the lug fitting within the said socket or recess whereby said end is prevented from moving circumferentially of the clutch members, a ring-expanding lever, a pivotal stud for said lever having its inner end supported by one of said members, means for operating said lever, and a covering-flange at the side of said clutch members serving to retain the ring and lever in place and form a cover for the space in which said parts are contained between the opposing faces of the two clutch members, substantially as described.

8. A friction-clutch comprising, essentially, the inner member, the outer member, the split ring between the flanges of said members and by which the engagement of the inner and the outer clutch members with each other may be effected, a ring-expanding lever, a pivotal stud for said lever having its inner end supported by one of said members, means for operating said lever, and a covering-flange at the side of said clutch members provided with a support for the outer end of said stud and serving to retain the ring and lever in place and form a cover for the space in which said parts are contained between the opposing faces of the two clutch members, substantially as described.

9. A friction-clutch comprising, essentially, outer and inner members, one thereof provided with recesses, 12 and 121, a split ring having one end thereof provided with a connecting-lug removably seated in one of said recesses, an operating-lever engaging with the free end of said ring and having the hub thereof received in the other of said recesses, a pivotal stud for said lever connected by the inner end thereof with the recessed member, the annulus or flange secured to one side of the said member at the outer side of the hub or lever, closing the space in which the ring and said hub are contained and providing a support for the outer end of said pivotal stud, and means to operate said lever, substantially as described.

In testimony whereof I affix my signature in presence of two witnesses.

ALLAN CAMERON SARGENT.

Witnesses:
   CHAS. G. SARGENT,
   EDW. F. CONNORS.